UNITED STATES PATENT OFFICE.

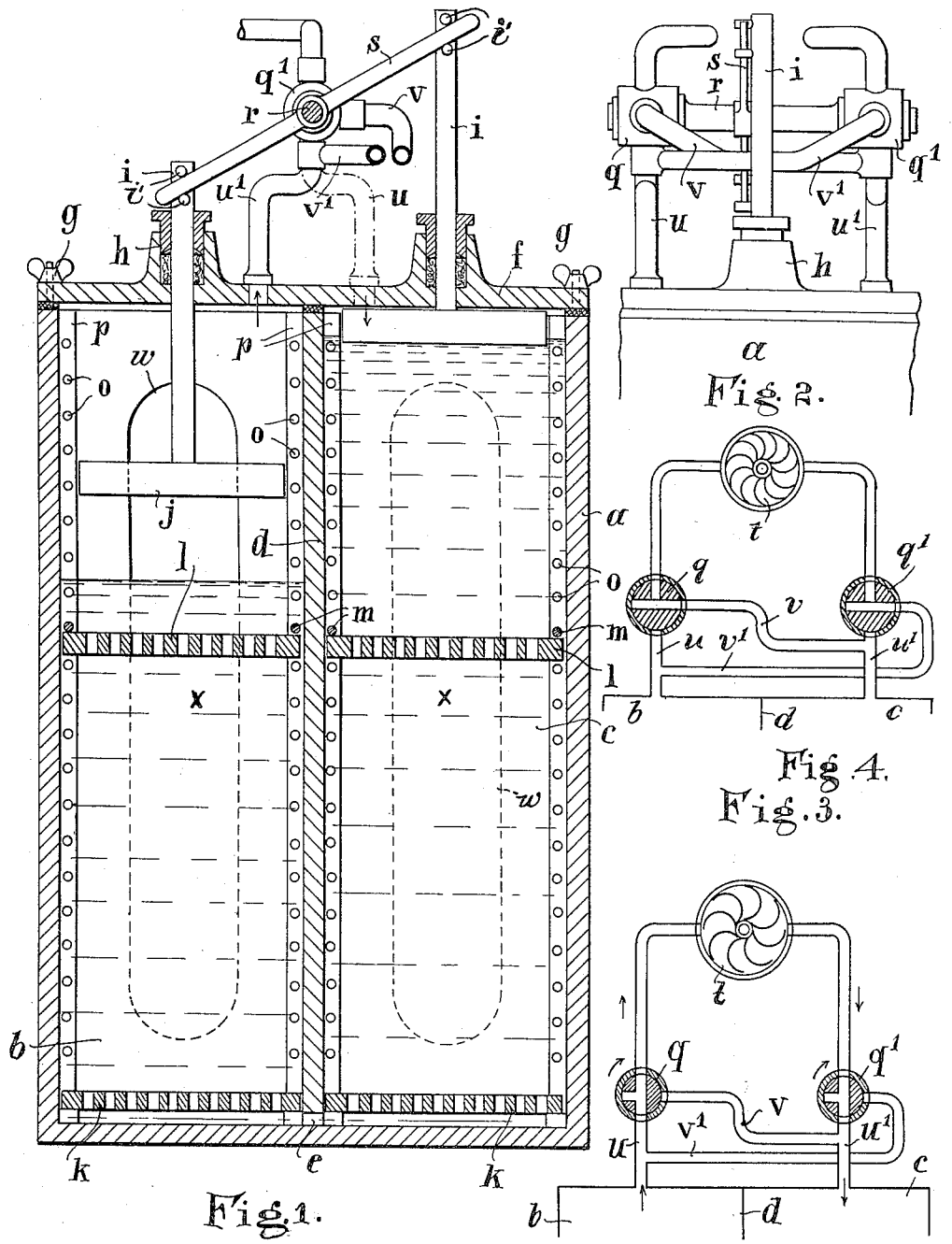

ORLANDO SUMNER AND EMILY HOWARTH SUMNER, OF ST. MARGARETS-ON-THAMES, ENGLAND.

APPARATUS FOR BLEACHING, DYEING, AND THE LIKE.

1,133,759.

Specification of Letters Patent. Patented Mar. 30, 1915.

Application filed October 7, 1913. Serial No. 793,876.

*To all whom it may concern:*

Be it known that we, ORLANDO SUMNER and EMILY HOWARTH SUMNER, citizens of the Kingdom of Great Britain and Ireland, and residents of The Cottage, Netherton Road, St. Margarets-on-Thames, Middlesex, England, have invented certain new and useful Apparatus for Bleaching, Dyeing, and the like, of which the following is a specification, such as will enable others skilled in the art to which it appertains to make and use the same.

This invention relates to apparatus for bleaching and dyeing and may be broadly described as comprising a receptacle preferably having more than one compartment and provided with a cover which can be closely fastened down said receptacle being used in conjunction with a pump which can either or both draw and force liquid from one compartment to another, means being provided whereby the liquid is either returned by the way it came or is circulated so as to repeatedly pass through the articles, material or substance placed in one or more of the compartments.

It is generally advantageous to make the compartments in the one receptacle but quite within the scope of the invention to have them at a distance apart and suitably connected by pipes.

A preferred form of the invention comprises a receptacle, say rectangular or cylindrical, having a central web or partition of solid material which divides the receptacle into two equal-sized compartments entirely shut off from communication with each other except by one or more openings, say a slot or a number of perforations close to the bottom of the partition through which liquid can pass to and fro from one compartment to the other. Each compartment has a float connected to a rod extending upwardly through a stuffing box in the cover. One or more valves or cocks, say two three-way cocks, are mounted on the cover and connected to the compartments and to a constantly driven suction and delivery pump. The plugs of these cocks are connected as by links to the beforementioned float rods in such a manner that when one compartment is sufficiently filled with liquid to raise its float and rod the plug of a cock is turned to the delivery side of the pump and air is forced into the filled compartment and presses the liquid into the other compartment which has been emptied of liquid, the flow of liquid being accelerated by the opening of the suction side of the pump through the other cock to the said emptied compartment.

In the accompanying drawings, Figure 1 shows in vertical section a receptacle divided into two compartments to the covers of which the distributing cocks are fitted. Fig. 2 is a side elevation of the distributing cocks. Figs. 3 and 4 diagrammatic views shown in different positions of the connections of the pump and the cocks.

The receptacle $a$ is divided into compartments $b$ and $c$ by the partition $d$ which has small openings $e$ at the bottom. The cover $f$ is fixed by wingnuts $g$ and has stuffing boxes $h$—$h$ through which the rods $i$—$i$ of floats $j$—$j$ are passed.

A perforated plate $k$ is fitted as a false bottom in each compartment and a perforated plate $l$ is also provided in each compartment and is adapted to be held down by pins $m$ fitted into holes $o$ of the bars $p$. The plates $k$—$k$ serve to distribute the liquid passing upwardly through them while the plates $l$ distribute the liquid passing downwardly and also serve to hold the material $x$ which is under treatment within a variable limited space.

The distributing means consists of two three-way cocks $q$, $q'$, having a common spindle $r$ to which a turning motion is imparted by the float rods $i$ through the link or lever $s$, the ends of which are loosely held between pins $i'$. Instead of said pins a slot may be provided in each of the rods through which the ends of the link pass, or the rods may have collars or the like to co-act with the link. Each of the three-way cocks is connected to one side of the pump $t$ as well as to one of the compartments $b$ and $c$ respectively, the latter connection being established by pipes $u$ and $u'$. There is also connection between each valve and the delivery pipe of its opposite plug, the valve $q$ being connected to pipe $u'$ by a branch pipe $v$, while the valve $q'$ is connected to pipe $u$ by a similar branch pipe $v'$. Brackets or the like may be provided to support the distributing cocks, although they are not shown in the drawings.

The apparatus works in substantially the following manner: The material to be treated is placed into the compartments and the perforated plates $l$ closed down onto it and held by means of the pins $m$, after which the dyeing, bleaching or other liquid is introduced and the entire apparatus closed by means of the cover $f$. Owing to the perforations $e$ at the bottom of the partition the liquid will assume the same level in both compartments. Now the pump $t$ is started so as to force air into one of the compartments, at the same time sucking it from the other. The liquid in the former compartment is thus caused to fall while in the latter it is caused to rise, and to eventually lift the float, thereby turning the cock spindle by means of the link $s$. Such turning of the spindle effects the reversing of the suction and compression with regard to the compartments; the pump delivering always in the same direction. Referring to Figs. 1 and 3 for example, the liquid in compartment $c$ has risen sufficiently high to lift the float to its highest position so as to turn the cocks into the position shown in the diagram of Fig. 3, in which the pump $t$ just commences to force air into the compartment $c$ through pipe $u'$; the air from $b$ being drawn out through pipe $u$. The liquid in $c$ will now fall and in $b$ it will rise thereby thoroughly penetrating the material in the compartments. The rising liquid in $b$ will eventually lift the float thus turning the cocks in the direction of the arrows shown in Fig. 3 to the position shown in Fig. 4 and so direct the force of the air through the pipes $v'$ and $u$ into the compartment $b$ where the liquid will be caused to fall, and to simultaneously draw air from $c$ through pipes $u'$ and $v$ so as to cause the liquid in that compartment to rise. This operation repeats itself any desired length of time and as long as the pump is working.

Inspection windows, such as $w$, may be provided in either or both compartments, through which windows the progress of work may be observed.

What we claim and desire to secure by Letters Patent is:—

1. Apparatus for bleaching, dyeing and like purposes comprising two compartments each of which is charged with both material and liquid, each compartment having a float mechanically connected to the cock of a pump, said cock being operated by the rising and falling of the floats so as to open the pump alternately to the compartments.

2. Apparatus for bleaching, dyeing and like purposes comprising a plurality of closed compartments each of which is charged with both material and liquid, communicating pipes between said compartments, a plurality of cocks operated by the rising and falling of the floats in the compartments and a constantly running pump, the efforts of which are communicated to the compartments according to the positions of the cocks.

3. Apparatus for bleaching, dyeing and like purposes comprising two closed compartments connected together each compartment having a float mechanically connected to the cock of a pump, said cock being operated by the rising and falling of the floats so as to open the pump alternately to the compartments both compartments having removable perforated plates for the purpose of distributing the flow of liquid.

4. Apparatus for bleaching, dyeing and like purposes comprising a receptacle having a close fitting removable cover divided by a partition into two compartments open to each other through the partition and toward the bottom thereof, a float in each compartment, each float having a rod passing out through the cover and connected to a multi-way cock.

5. Apparatus for bleaching, dyeing and like purposes comprising a receptacle having a close fitting removable cover divided by a partition into two compartments open to each other through the partition and toward the bottom thereof, a float in each compartment, each float having a rod passing out through the cover and connected to a multi-way cock, the said compartments having removable perforated plates with means for adjustably holding some of them in the compartments.

6. Apparatus for bleaching, dyeing and the like purposes comprising a receptacle divided into two compartments each of which is furnished with a perforated false bottom below which is means of communication from one compartment to the other, each compartment having a removable perforated plate capable of vertical adjustment in the compartment, a cock outside each compartment and connected to a float in said compartment and to a pump.

7. Apparatus for bleaching, dyeing and the like purposes comprising a receptacle divided into two compartments each of which is furnished with a perforated false bottom below which is a means of communication from one compartment to the other, each compartment having a removable perforated plate capable of vertical adjustment in the compartment, cocks outside of the compartments and communicating with the compartments and a pump, said compartments having in them floats mechanically connected to the cocks for the purpose of opening and closing same so as to alternate the action of the pump in the compartments.

8. Apparatus for bleaching, dyeing and like purposes having in combination a receptacle divided into compartments communicating with each other, perforated plates and floats in each compartment, cocks outside the receptacle and mechanical connections between the cocks and floats and a pump with connections to the cocks and through them to the receptacle.

In witness whereof we have hereunto set our hands in presence of two witnesses.

ORLANDO SUMNER.
EMILY HOWARTH SUMNER.

Witnesses:
HENRY FAIRBROTHER,
BRUNO KATZ.

Copies of this patent may be obtained for five cents each, by addressing the "Commissioner of Patents, Washington, D. C."